(12) United States Patent
Friedberger et al.

(10) Patent No.: US 8,407,980 B2
(45) Date of Patent: Apr. 2, 2013

(54) MICROTHRUSTER

(75) Inventors: Alois Friedberger, Oberpframmern (DE); Georg Schulte, Neuenstadt (DE); Gerhard Mueller, Grafling (DE); Dimitri Telitschkin, Heilbronn (DE); Stefan Ziegenhagen, Bammental (DE)

(73) Assignee: Astrium GmbH, Munich (DE)

( * ) Notice: Subject to any disclaimer, the term of this patent is extended or adjusted under 35 U.S.C. 154(b) by 1529 days.

(21) Appl. No.: 12/068,261

(22) Filed: Feb. 5, 2008

(65) Prior Publication Data

US 2009/0120056 A1    May 14, 2009

(30) Foreign Application Priority Data

Feb. 5, 2007    (DE) .................. 10 2007 006 444

(51) Int. Cl.
*F03H 1/00*    (2006.01)
(52) U.S. Cl. ...................................... 60/203.1
(58) Field of Classification Search ............. 60/200.1, 60/203.1; 431/262, 258, 259
See application file for complete search history.

(56) References Cited

U.S. PATENT DOCUMENTS

| | | | |
|---|---|---|---|
| 3,328,960 A * | 7/1967 | Martin | 60/202 |
| 3,603,093 A | 9/1971 | Isley et al. | |
| 5,780,157 A * | 7/1998 | Tuffias et al. | 428/408 |
| 6,263,665 B1 * | 7/2001 | Ketsdever et al. | 60/203.1 |
| 6,516,604 B2 | 2/2003 | Mojarradi et al. | |
| 6,546,714 B1 * | 4/2003 | Schneider | 60/211 |
| 6,786,716 B1 * | 9/2004 | Gardner et al. | 431/268 |
| 6,931,832 B2 * | 8/2005 | Berg et al. | 60/206 |
| 2002/0023427 A1 | 2/2002 | Mojarradi et al. | |
| 2004/0214429 A1 * | 10/2004 | Han et al. | 438/642 |

FOREIGN PATENT DOCUMENTS

| | | |
|---|---|---|
| DE | 101 18 005 | 10/2002 |
| KR | 100649549 | 11/2006 |
| RU | 2118685 C1 * | 9/1998 |

OTHER PUBLICATIONS

R. Bayt et al., Systems Design and Performance of Hot and Cold Supersonic Microjets, 39th AIAA Aerospace Sciences Meeting and Exhibit, Jan. 8-11, 2001 Reno, Nevada, Document No. AIAA-2001-0721.

* cited by examiner

*Primary Examiner* — Phutthiwat Wongwian
(74) *Attorney, Agent, or Firm* — Greenblum & Bernstein, P.L.C.

(57) ABSTRACT

Microthruster includes a combustion chamber comprising a substrate material, a fuel inlet, and a gas outlet. A first resistance heater is arranged in the combustion chamber. A catalyst is structured and arranged to decompose fuel entering the combustion chamber. First substrate material sections are heated by the first resistance heater to at least one of a predetermined temperature and a predetermined temperature range.

40 Claims, 9 Drawing Sheets

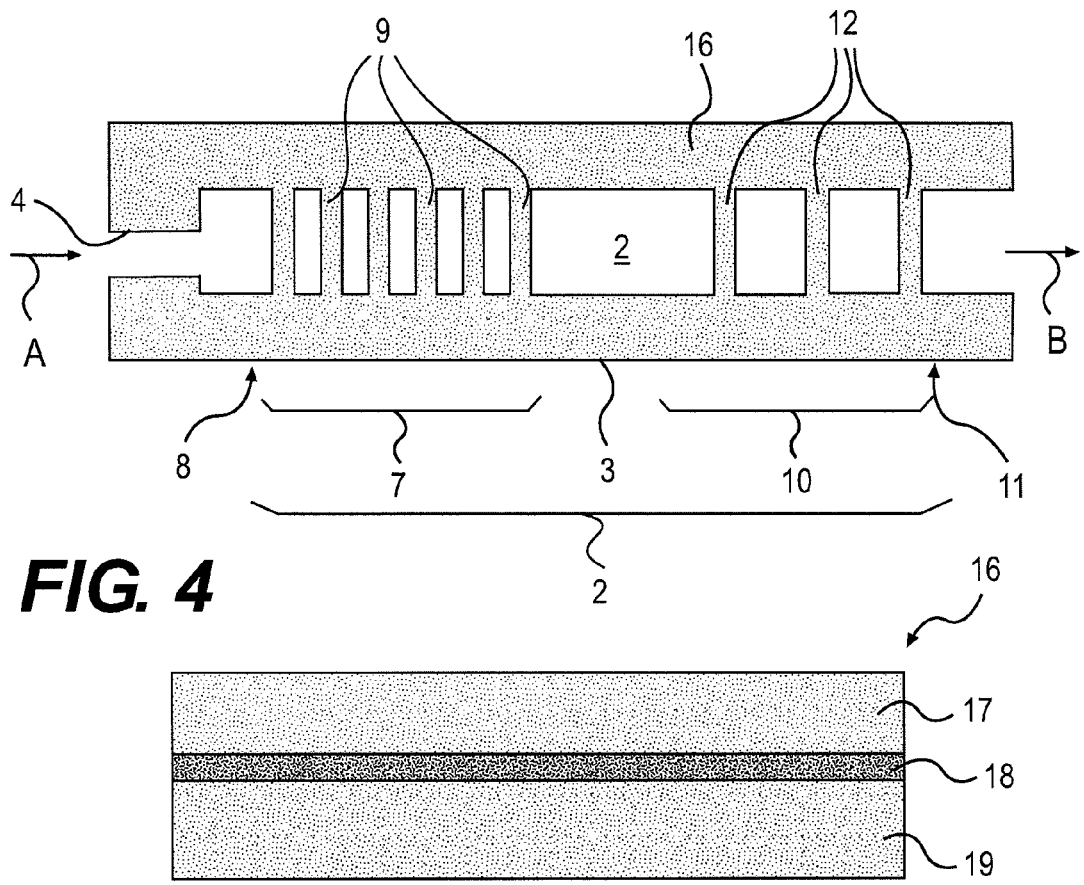
FIG. 4
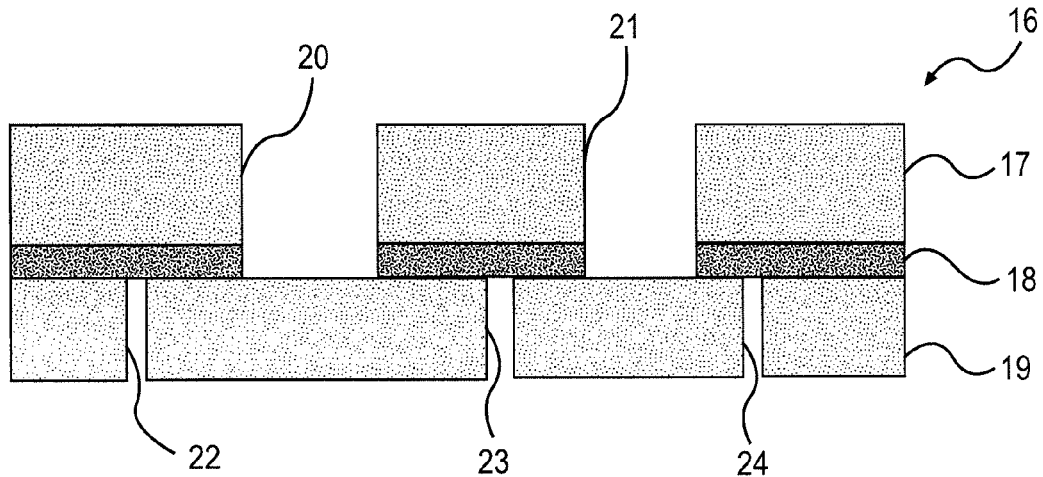
FIG. 5
FIG. 6

MICROTHRUSTER

CROSS-REFERENCE TO RELATED APPLICATIONS

The present application claims priority under 35 U.S.C. §119 of German Patent Application No. 10 2007 006 444.8-13, filed on Feb. 5, 2007, the disclosure of which is expressly incorporated by reference herein in its entirety.

BACKGROUND OF THE INVENTION

1. Field of the Invention

The invention relates to a microthruster, in particular for use as a position adjustment thruster, with a combustion chamber of a substrate that is made in particular from an electrically conductive material/substance, the combustion chamber comprising a fuel inlet and a gas outlet to a thrust nozzle adjoining the combustion chamber. The microthruster further comprises a first resistance heater arranged in the combustion chamber. The invention further relates to a thruster. Finally, the invention relates to a method for producing a microthruster with a combustion chamber that comprises a fuel inlet and a gas outlet to a thrust nozzle adjoining the combustion chamber as well as a first resistance heater arranged in the combustion chamber and assigned to a catalyst.

2. Discussion of Background Information

Microthrusters, which are used as satellite position adjustment thrusters, are embodied, e.g., by so-called monergol hydrazine thrusters. These microthrusters are generally equipped with a heater, e.g., in the form of an electric resistance heater. The heater is typically installed outside on a combustion chamber or decomposition chamber. The heater heats the combustion chamber by means of heat transfer through a chamber wall to a defined starting temperature. The disadvantage with the heater arranged outside the combustion chamber is a non-uniform temperature distribution in the interior of the combustion chamber. Furthermore, the inertia of the heat transfer necessitates a relatively high expenditure of time and consequently a proportional expenditure of electric energy. Since the electric energy available in a satellite is limited, the most efficient possible use thereof is desirable.

It is therefore known to provide the heater in the interior of the combustion chamber. This is described, e.g., in the article "Systems Design and Performance of Hot and Cold Supersonic Microjets," Robert L. Bayt, Kenneth S. Breuer, AIAA-2001-0721, 39th AIAA Aerospace Finances Meeting and Exhibit, 8-11 Jan. 2001 Reno, Nev.

SUMMARY OF THE INVENTION

The object of the present invention is to disclose a microthruster, in particular a position adjustment thruster embodied as a monergol hydrazine thruster for a satellite, with which the efficiency of the microthruster can be further improved and energy consumption reduced with low expenditure. Another object of the invention lies in disclosing a method for producing a microthruster of this type.

These objects are attained through the features of the independent claims. Advantageous embodiments are revealed by the dependent claims.

A generic microthruster is characterized in that a first resistance heater arranged in the combustion chamber is assigned to a catalyst to decompose fuel inserted into the combustion chamber, wherein first substrate material sections, which are optionally made from the substrate material and embody the catalyst, can be heated by the first resistance heater to a predetermined temperature or a predetermined temperature range. However, it is possible to bring about a uniform temperature distribution in the catalyst, the inertia of the heat transfer being low. The catalyst can thereby be heated to the necessary temperature or the necessary temperature range within a relatively short time. The expenditure of electric energy for this purpose is low.

The first resistance heater can be embodied by the first substrate material sections of the catalyst itself. Silicon or silicon carbide (SiC) in particular are suitable as a material or substance for the substrate and the substrate material sections. Alternatively, the substrate can be made from sapphire, the substrate material sections being made from, e.g., a ceramic in this variant.

The decomposition quality of the fuel depends on the temperature of the catalyst. If the (starting) temperatures at the catalyst are too low, this leads to its rapid degradation, i.e., a mechanical destruction of the catalyst. In order to avoid this, combustion chambers of catalytic microthrusters are equipped with the first resistance heater. The catalyst is heated to a necessary minimally permissible operating temperature before starting each time. Through the direct use of the electrical properties of the catalyst, in that the catalyst itself embodies the first resistance heater, losses can be reduced which are necessary for helping to heat the combustion chamber. The electrical energy supply of a satellite can thus be optimized. Furthermore, the service life of the catalyst can be extended.

It is expedient if the first substrate material sections are coated at least partially with a catalyst material and the first resistance heater is embodied by the catalyst layer. Platinum, for example, can be used as the catalyst material. It is hereby further expedient if an insulating layer is arranged at least partially between the catalyst layer and the first substrate material sections. The insulating layer makes it possible to embody the catalyst layer as a first resistance heater.

The efficiency of the catalyst is furthermore improved if the first substrate material sections in the combustion chamber have an at least partially porous surface structure. The porosity can be produced by an electrochemical process using an electrolyte. Conducting current through the first substrate material sections themselves can be difficult, if these are porous such that individual grains are formed which no longer touch one another. This must be taken into consideration in the production of the porous surface structure of the first substrate material sections. The porosity can be adjusted by the selection of the electrolyte concentration and/or the current density and/or a specific resistance of the substrate material. An etching process can be used in the known manner as an electrochemical process, the first substrate material sections being made porous entirely or on their entire surface.

According to one embodiment, a second resistance heater is arranged in the interior of the combustion chamber between the catalyst and the gas outlet in order to heat a gas leaving the catalyst. This is advantageous in order to increase efficiency. The gas leaving the catalyst is thereby heated while still in the combustion chamber, i.e., before entry into the thrust nozzle. The gas afterheating is thereby not carried out from outside, but inside the combustion chamber by the second resistance heater. The second resistance heater can hereby be embodied by second substrate material sections, which are optionally made from the substrate material. Current is hereby conducted through the second substrate material sections in particular embodied in a columnar manner.

Another embodiment provides that the first and/or second substrate material sections are produced from the substrate material of the combustion chamber by a mechanical or a chemical process, so that a base of the combustion chamber is produced from which the first and/or second substrate material sections project in each case in a columnar manner into the interior of a combustion chamber volume. It is hereby expedient if a first column spacing of the first substrate material sections is different from, in particular smaller than, a second column spacing of the second substrate material sections.

The combustion chamber volume is limited by a cover layer of the combustion chamber, which adjoins the first and/or second substrate material sections. The cover layer is expediently made from a structured SOI wafer (SOI=silicon on insulator), an electrical bonding of the first and/or second resistance heater taking place via the cover layer. The connection between the cover layer and the substrate material can take place, e.g., by direct bonding or eutectic bonding or solder glass or ceramic adhesive or by soldering. Providing the electrical bonding of the first and/or the second resistance heater via the cover layer makes it possible to heat the first and the second resistance heater independently of one another.

An SOI wafer comprises a silicon substrate, an insulating $SiO_2$ layer arranged thereon and a silicon layer arranged on this layer. The SOI wafer can be structured and connected to the base structure, i.e., to the already processed substrate of the microthruster, using known micro systems engineering methods. It is thereby possible to bond the first resistance heater as well as the second resistance heater and to control them independently of one another without short circuits. Sufficient mechanical stability is nevertheless ensured.

The conductivity of the first and/or second substrate material sections can be adjusted through a corresponding doping of the substrate material. The resistance can be thereby regulated. At high operating temperatures an intrinsic conduction begins, so that the influence of the doping becomes less and less important. The conductivity is then determined primarily through the geometry, i.e., the cross section, the height and number of the first and/or second substrate material sections.

In a further embodiment the cover layer has a peripheral boundary section, which lies at least partially in an assembly plane, with which the cover layer is connected to the substrate, and a functional area surrounded by the boundary section, which functional area is set back with respect to the assembly plane, a layer arrangement of an insulating layer, a metallization layer and a passivation layer being provided in the functional area, wherein the layer arrangement does not project beyond the assembly plane. This makes it possible to bond the first and/or second resistance heater embodied by the metallization layer in a simple and reliable manner. Since a channel may form, which connects the combustion chamber volume to the outside, it is expedient to fill this channel completely with the material of the passivation layer and then to buff and polish the whole in order to obtain a flat surface. After this the connection process between the cover layer and the prepared substrate can take place.

In another embodiment it is provided for a feed line section to be provided in the peripheral boundary section, which feed line section is part of the functional area, a space between the passivation layer and the assembly plane being filled with passivation material or filler paste. The filler paste can hereby be inserted via a bore in the substrate material. This preferably occurs after the process of connecting cover layer and substrate. This further ensures that the combustion chamber has a closed combustion chamber volume, only the fuel inlet and the gas outlet being provided.

In a further embodiment, the first resistance heater and/or the second resistance heater is made from a meandering conductor structure of a metal, which is arranged in particular on the cover layer.

Furthermore, a first means for detecting a first resistance of the first resistance heater and/or a second means for detecting a second resistance of the second resistance heater can be provided, wherein the first resistance and/or the second resistance can be fed to a third means for determining a first temperature from the first resistance and a second temperature from the second resistance. In this manner the temperature of the catalyst as well as of the gas afterheater can be measured via the resistance of the first or second resistance heater.

This is carried out in a simple manner by measuring current and voltage. Through this the production expenditure can be reduced, since the insertion of temperature sensors into the combustion chamber can be omitted.

In addition a temperature sensor can be arranged outside the combustion chamber and coupled to the third means to compensate for a resistance drift of the first and second resistance. Whenever the thruster is not in operation, i.e., combustion chamber temperature and temperature of the reference temperature sensor are the same, an offset correction can be carried out, since in this case both temperatures must be the same.

In another embodiment a third heater, in particular a resistance heater, is provided, which is assigned to the thrust nozzle. Through this the performance of the microthruster can be increased.

As explained above, silicon or silicon carbide is used as the material for the substrate. It is possible to porositize silicon as well as silicon carbide. All the described connection techniques can also be used with silicon carbide.

With the use of sapphire instead of silicon or silicon carbide as the material for the substrate, a still higher temperature resistance is achieved. Sapphire likewise permits bond processes for connecting cover layer and substrate. However, one disadvantage is a more difficult processing, since the coarse structures must be produced mechanically. To produce a large-area catalyst, a correspondingly porous structure coated with catalyst material must penetrate into the combustion chamber before the wafer bonding, which can be accomplished, e.g., by a porous ceramic coated with platinum.

The invention also relates to a thruster that comprises a plurality of microthrusters of the above-mentioned type. The plurality of microthrusters is thereby preferably arranged in an array.

A method according to the invention for producing a generic microthruster comprises the following steps: providing a substrate, in particular silicon, silicon carbide or sapphire; producing first and/or second substrate material sections from the substrate by a mechanical or chemical process, so that a base of the combustion chamber is produced, from which base the first and/or second substrate material sections in each case project in a columnar manner into the interior of a combustion chamber volume; at least partial coating of the first substrate material sections with a catalyst material; providing a structured cover layer, in particular in the form of an SOI substrate, with a metal structure; applying the cover layer to the structured substrate and connecting it so that the combustion chamber volume is limited by the cover layer of the combustion chamber and the metal structure lies near to the first and/or second substrate material sections. The method according to the invention makes it possible to produce a heater for a catalyst, and optionally to produce a gas afterheater, in the interior of the combustion chamber of the microthruster easily and efficiently.

The first substrate material sections are expediently provided with an at least partially porous surface structure before coating with the catalyst material, in that they are treated with an electrolyte of a predetermined electrolyte concentration or coated with a porous layer.

A insulating layer is expediently applied between the first substrate material sections and the catalyst material, whereby the catalyst material itself can serve as a resistance heater.

The first and/or second substrate material sections or the catalyst material on the first substrate material sections are electrically connected through the metal structure that is applied to the cover layer. The use of known production steps from micro systems engineering thereby makes it possible to produce a microthruster according to the invention simply and efficiently.

The cover layer and the substrate can be connected to one another by direct bonding, eutectic bonding, solder glass, ceramic adhesive or soldering. Direct bonding lends itself when the cover layer and the substrate or the first and/or second substrate material sections are made of silicon. When solder glass is used, the temperature resistance must be taken into account. With ceramic adhesive the gas tightness must be taken into account. With soldering, in particular active soldering, the high thermal coefficient of expansion of metal must be taken into consideration.

In another embodiment of the method, a peripheral boundary section is produced in the cover layer by an abrasion process, which boundary section lies at least partially in an assembly plane, with which the cover layer is connected to the substrate material, wherein a functional area surrounded by the boundary section is produced, which functional area is set back with respect to the assembly plane. This approach lends itself in order, e.g., to bond a resistance heater in the form of a metal meander applied to the cover layer, without impeding the connection of the cover layer and the substrate, e.g., by direct bonding or eutectic bonding, and nevertheless ensuring a tightness of the combustion chamber. The method can be applied in order to use structures analogous to the meandering heaters as temperature sensors in order to use the temperature data for process control. To this end, a recess a few micrometers deep can be etched within the scope of the abrasion process, wherein a broad outer boundary, which is not subjected to the etching process, forms the boundary section. The boundary section is connected to the substrate within the scope of the connection process.

It is expedient if a layer arrangement of an insulating layer, a metallization layer and a passivation layer is produced in the functional area such that the layer arrangement does not project beyond the assembly plane. A feed line section is embodied in the peripheral boundary section within the scope of the abrasion process, which feed line section is part of the functional area, wherein a space between the passivation layer and the assembly plane is filled with passivation material. After the application of the passivation material of the passivation layer, the cover layer can be buffed and polished in order to obtain a flat surface and finally to render possible the bonding with the substrate.

In a further process step, after the process of connecting cover layer and substrate, the feed line section is filled with a filler paste, the filler paste being inserted via a bore in the cover layer or the substrate in the region of the feed line section. This approach makes it possible first to connect the cover layer to the substrate and only thereafter to carry out a sealing of the combustion chamber.

Furthermore, it is possible for an electrically insulating passivation layer to be applied to the back of the substrate, which passivation layer is opened only in the area of the first substrate material sections. This restricts current flow through the back to this opening, whereby not the entire front but preferably the region of the first substrate material sections, i.e., the columns, is provided with a porous surface structure in the electrochemical process.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein

FIG. 4 shows a sectional view of the substrate shown in FIG. 2 with a cover layer applied thereto;

FIG. 5 shows a cover layer in the form of an unstructured SOI wafer;

FIG. 6 shows an SOI wafer from FIG. 5, which is provided with a structuring;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
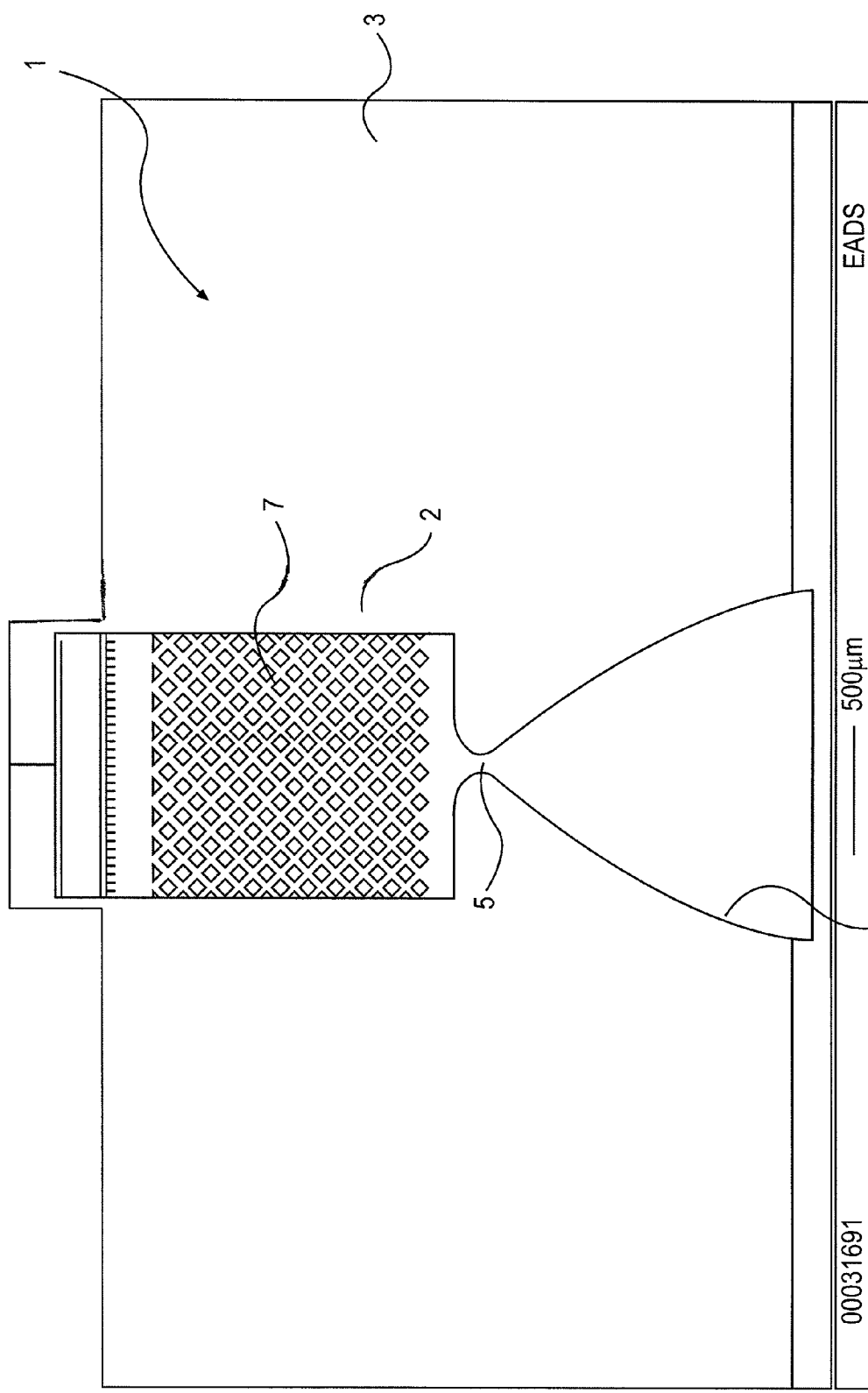
FIG. 1 shows a perspective view of a microthruster.

The typical design of a microthruster 1, such as is used as a satellite position adjustment thruster, is shown in FIG. 1 in a perspective representation. A combustion chamber 2 embodied in an elongated manner is embodied in a substrate 3. Substrate material sections are embodied in the interior of the combustion chamber 2, which sections extend approximately vertically from a base 13 of the combustion chamber 2 into the interior of the combustion chamber 2 (also referred to as combustion chamber volume) and which form a catalyst 7. The combustion chamber 2 opens at the lower edge, on the left in the figure, into a gas outlet 5, which adjoins a widening thrust nozzle 6. On the end lying opposite the gas outlet 5, the combustion chamber 2 has a fuel inlet (not shown in further detail in the figure), which is connected to a so-called plenum. To create a spatially limited combustion chamber volume, the substrate 3 structured in the described manner is provided with a cover layer. The substrate 3 can be made, e.g., of a semiconducting material, such as, e.g., silicon or silicon carbide. In this case it is possible to form the substrate material sections of the catalyst 7 from the substrate material through known micromechanical or chemical methods. Alternatively, sapphire can be used as the material for the substrate 3. Depending on the embodiment of a resistance heater assigned to the catalyst 7, it can be expedient thereby if the first substrate material sections are made from a different electrically conductive material or if they are coated with a catalytically active material.

Figure 2:
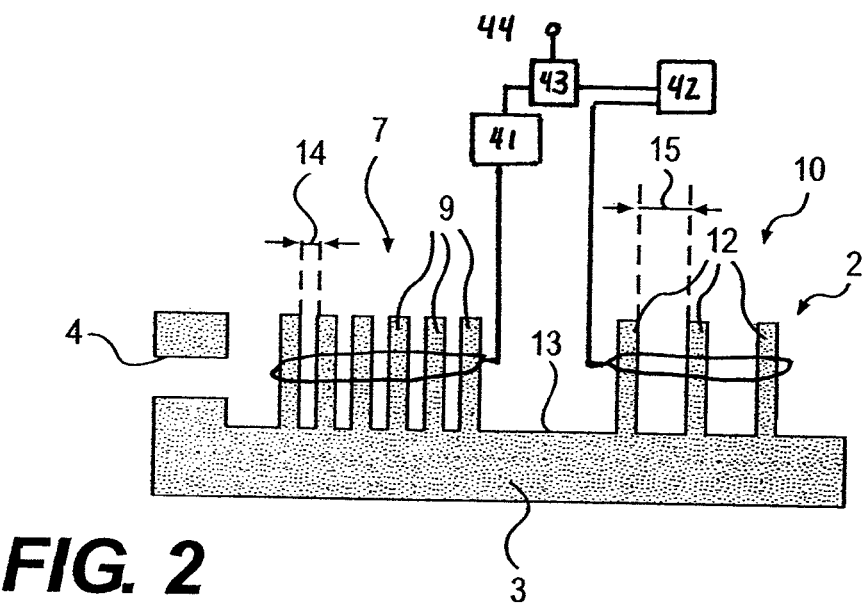
FIG. 2 shows a sectional representation through a section of a structured substrate of a microthruster in a side view.

FIG. 2 shows in a cross-sectional representation a sectional view through a section of a combustion chamber 2 of a structured substrate 3. Near a fuel inlet 4, the substrate material sections 9 extend from the base 13 of the substrate 3 in a columnar manner. The substrate material sections 9 have an at least partially porous surface structure, wherein the porosity can be produced by an electrochemical process using an electrolyte. The porosity can thereby be adjusted by the selection of the electrolyte concentration and/or the current density and/or a specific resistance of the substrate material, wherein the latter can be determined by the doping of the substrate material or the substrate material sections. An electrically insulating passivation layer can be applied to the back of the substrate 3, which layer is opened only in the region of the first substrate material sections 9. This restricts current flow through the back to this opening, whereby not the entire front, but preferably the region of the first substrate material sections 9, i.e., the columns, is provided with a porous surface structure in the electrochemical process.

The substrate material sections 9 are arranged at regular spacings from one another, a respective column spacing being characterized by reference number 14. A fuel, e.g., hydrazine $N_2H_4$, inserted via the fuel inlet 4, is decomposed in the catalyst 7. The decomposition quality of the fuel thereby depends on the temperature of the catalyst 7. Since if the temperature is too low at the catalyst, this leads to a rapid degradation of the catalyst 7, a resistance heater is assigned to the catalyst 7, through which the catalyst 7 is heated to a necessary minimally permissible operating temperature. To this end, as will become clear from the following description of other exemplary embodiments, current can be conducted through the substrate material sections 9 themselves, so that the resistance heater is embodied by the substrate material sections 9. Alternatively, the resistance heater can be embodied by a catalyst material, e.g., platinum, which is applied to the substrate material sections 9 for the coating thereof. In this case, depending on the conductivity of the substrate material section, it can be expedient to provide an insulation between the substrate material sections 9 and the catalyst material.

Furthermore, substrate material sections 12 are embodied in the combustion chamber 2, which sections are regularly spaced apart from one another, the column spacing being characterized by reference number 15. The column spacing 15 of the substrate material sections 12 is thereby larger than the column spacing 14 of the first substrate material sections 9. According to the previous description, current is likewise conducted through the substrate material sections 12 to embody a second resistance heater. Through this a gas afterheater 10 is formed, which is arranged between the catalyst 7 and a gas outlet not shown in FIG. 2. Through this the efficiency of the microthruster 1 can be increased. The gas afterheating is carried out before the gas enters the thrust nozzle. The second resistance heater is thereby embodied in the interior of the combustion chamber 2. Another advantage lies in a possible performance improvement.

To achieve the closed combustion chamber volume, a cover layer 16 is applied to the substrate shown in FIG. 2, as is shown, e.g., in FIG. 4. Preferably elements for electrical connection of the first and second resistance heaters 8 and 11 are thereby inserted in the cover layer 16. FIG. 4 furthermore shows the direction of the fuel supply (reference number A) and the gas exit direction (reference number B).

Figure 3:
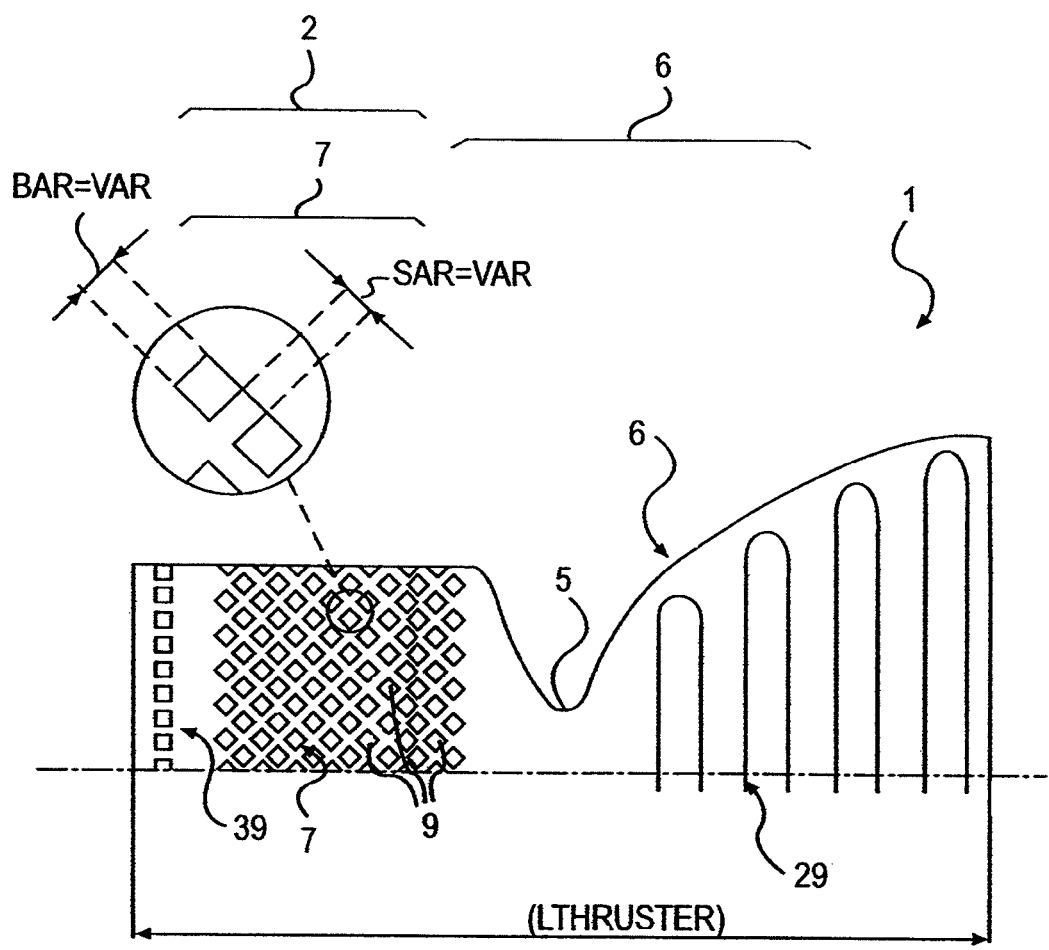
FIG. 3 shows a plan view of half of a microthruster.

FIG. 3 shows half of a microthruster in a plan view. Thereby only the catalyst 7, formed by the substrate material sections 9 and injection elements 39 are shown in the combustion chamber. The substrate material sections 9 are arranged by way of example at an angle of approx. 45 degrees to the injection elements 39. The column spacing 14 between respective substrate material sections 9 is smaller than a side length of respective substrate material sections in cross section. The broken line extending from left to right represents a mirror axis. The extension of the microthruster into the sheet plane is approx. 60 to 300 micrometers. The gas outlet 5 is embodied by a constriction. In the exemplary embodiment according to FIG. 3, furthermore a heater 29 is assigned to the thrust nozzle 6, which heater can be embodied, e.g., by a metal meander that is arranged in the interior of the thrust nozzle. The total length of the microthruster is labeled by $L_{Thruster}$.

FIGS. 5 and 6 show a particularly preferred embodiment of the cover layer 16. The cover layer 16 is embodied as an SOI wafer in this exemplary embodiment. This wafer comprises a silicon layer 17, an $SiO_2$ layer 18 and another silicon layer 19. The SOI wafer is structured by known micro systems engineering methods in that outer cut-outs 20, 21 are inserted therein from an outer side and inner cut-outs 22, 23, 24 are inserted therein from an inner side. The outer cut-outs 20, 21 thereby penetrate the silicon layer 17 and the $SiO_2$ layer 18. The inner cut-outs 22, 23, 24, however, penetrate only the silicon layer 19.

Figure 7:
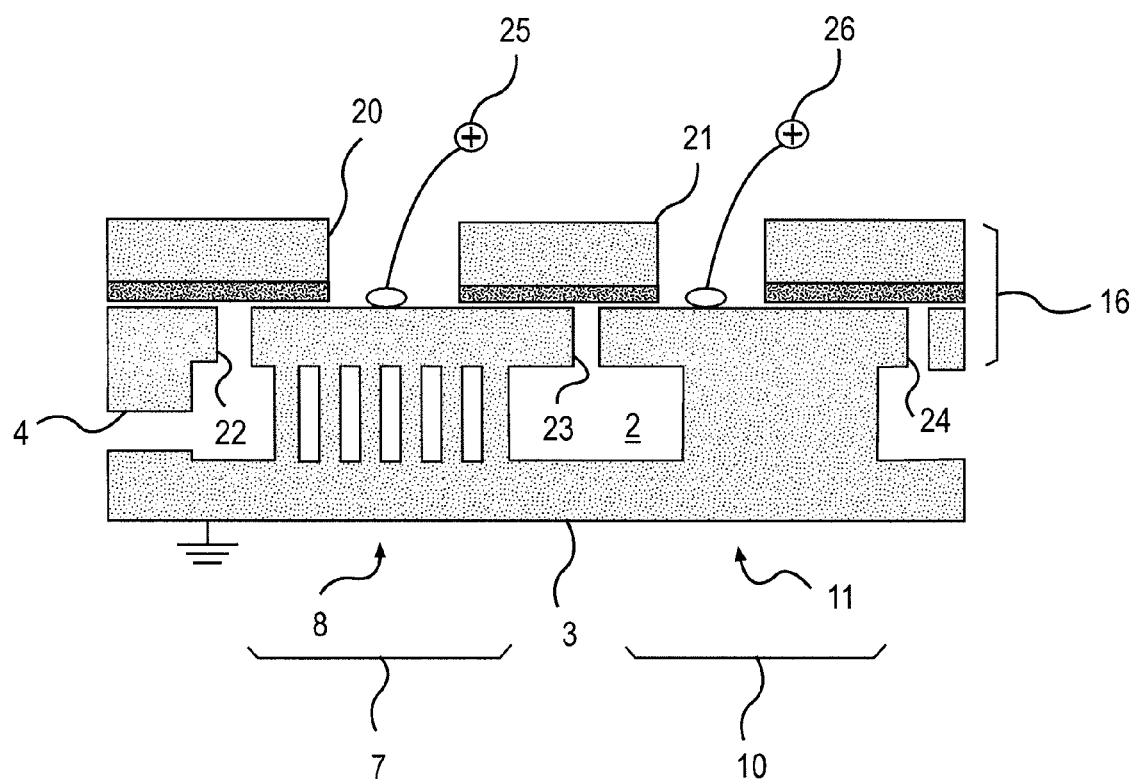
FIG. 7 shows an SOI wafer shown in FIG. 6 on a substrate according to FIG. 2.

In FIG. 7 the structured SOI wafer shown in FIG. 6 is applied to the substrate shown in FIG. 2. The base of the outer cut-out 20 is provided with an electrical contact 25 for the catalyst 7. The base of the outer cut-out 21 is provided with an electrical contact 26 for the gas afterheater in a corresponding manner. An independent bonding and heating of the first and second resistance heater 8, 11 is possible due to the structuring of the cover layer 16.

Connecting the cover layer 16 to the structured substrate 3 is carried out by methods that are customary in micromechanics, such as, e.g., silicon-silicon direct bonding. If a reliable current flow cannot be achieved through silicon-silicon direct bonding due to the cross section of the substrate material sections 9 or 12 being too small, alternative connecting methods, such as, e.g., eutectic bonding, can be used. Alternatively, the connection can also be made by solder glass, by ceramic adhesive or by soldering, e.g., active soldering.

Figure 8:
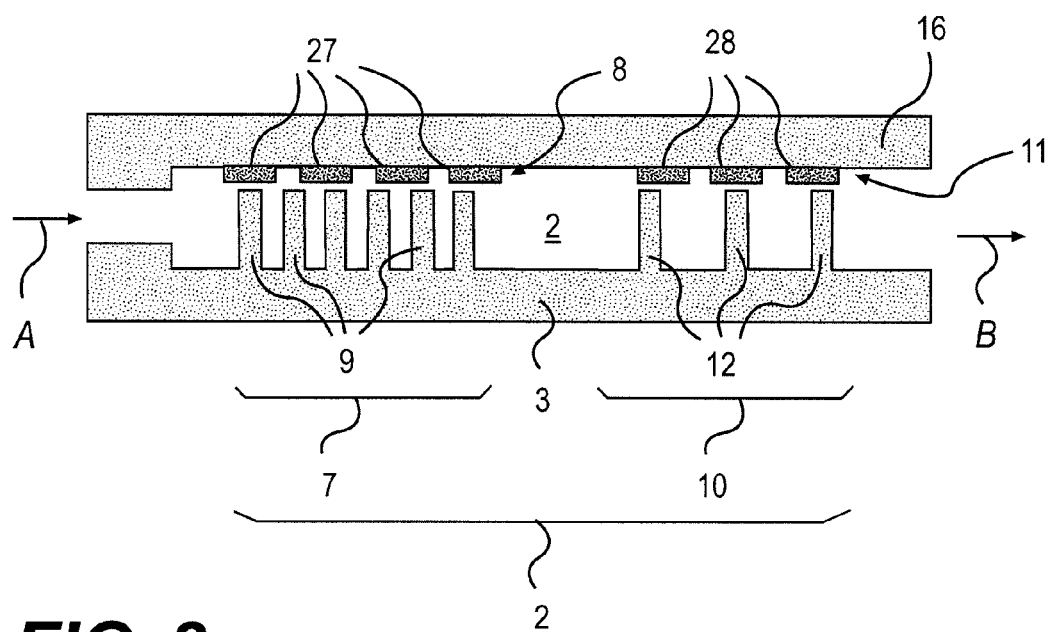
FIG. 8 shows a sectional view through a part of a microthruster, showing resistance heaters applied to the cover layer.

FIG. 8 shows an alternatively embodied cover layer on which meandering conductor structures 27, 28 are applied.

These are arranged on the side of the cover layer 16, so that they are located in the interior of the combustion chamber 2 after a mechanical connection operation of cover layer 16 and structured substrate 3. The conductor structures 27 thereby intersect with the substrate material sections 9, while the conductor structures 28 intersect with the substrate material sections 12. A simple way of being able to carry out the bonding of the conductor structures 27, 28, 29 arranged in the interior of the combustion chamber 2 without impeding the connection of cover layer 16 and structured substrate 3 and nevertheless ensuring the tightness of the combustion chamber 2, is described in FIGS. 9 through 12.

Furthermore, a first arrangement 41 for detecting a first resistance of the first resistance heater 9 and/or a second arrangement 42 for detecting a second resistance of the second resistance heater 12 can be provided. The first resistance and/or the second resistance can be fed to a third arrangement 43 for determining a first temperature from the first resistance and a second temperature from the second resistance. In this manner, the temperature of the catalyst 7, as well as, of the gas afterheater 10 can be measured via the resistance of the first or second resistance heater.

This can be carried out in a simple manner by measuring current and voltage. Through this arrangement, the production expenditure can be reduced, since the insertion of temperature sensors into the combustion chamber can be omitted.

In addition, a temperature sensor 44 can be arranged outside the combustion chamber 2 and can be coupled to the third arrangement 43 to compensate for a resistance drift of the first and second resistance. Whenever the thruster is not in operation, i.e., when the combustion chamber temperature and temperature of the reference temperature sensor are the same, an offset correction can be carried out, since, in this case, both temperatures must be the same.

Figure 9:
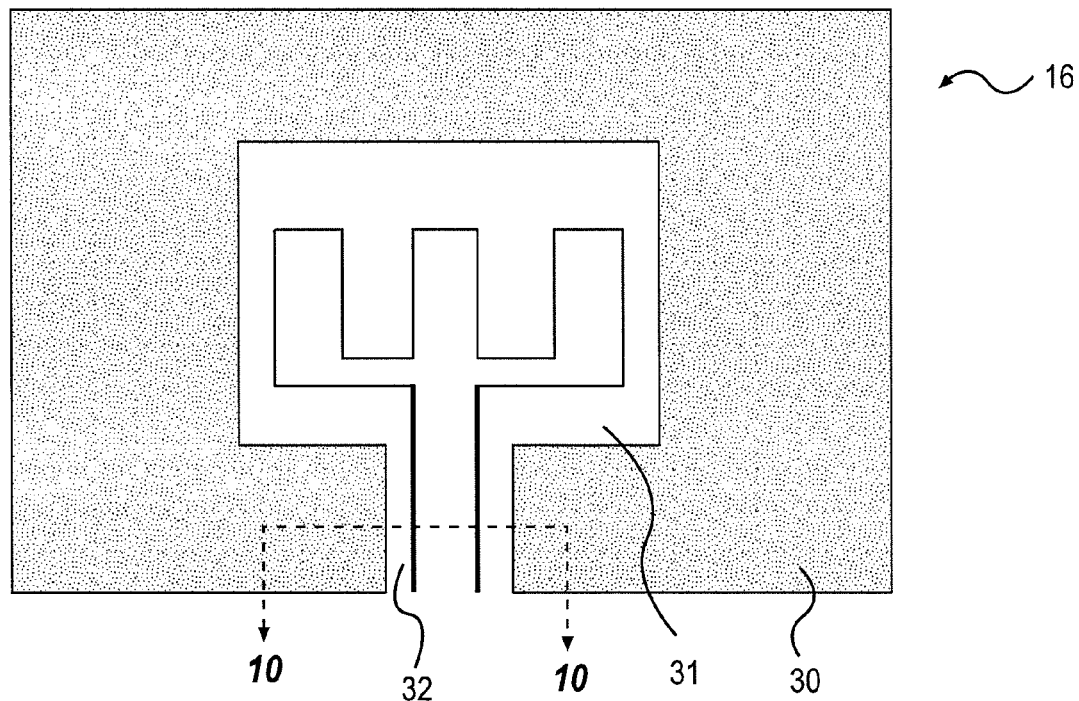
FIG. 9 shows a structured cover layer provided with a metallization layer in a plan view.
Figure 10:
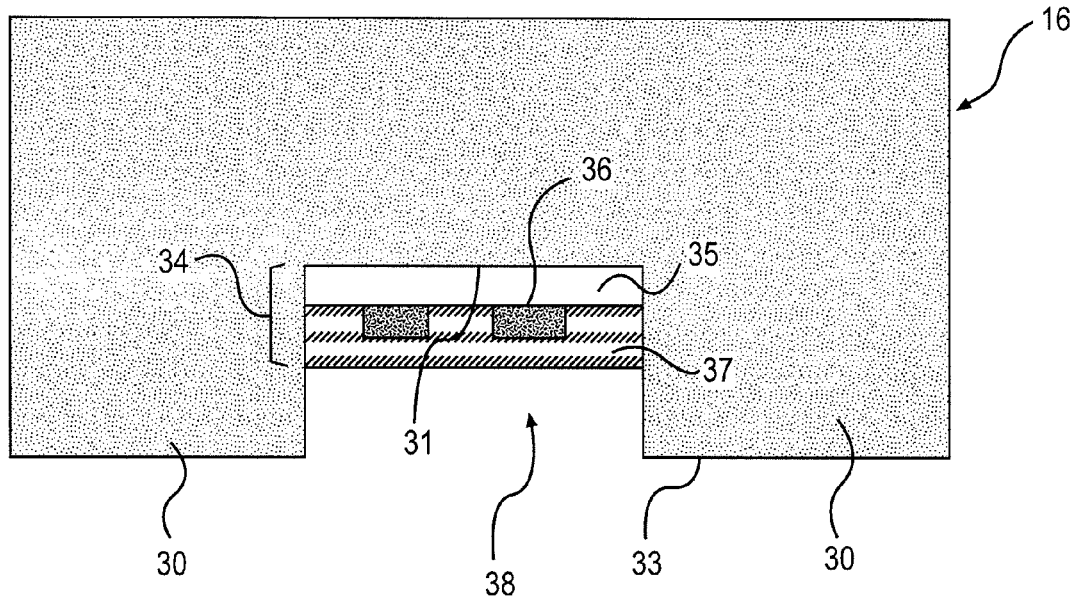
FIG. 10 shows a section through the cover layer shown in FIG. 9.
Figure 11:
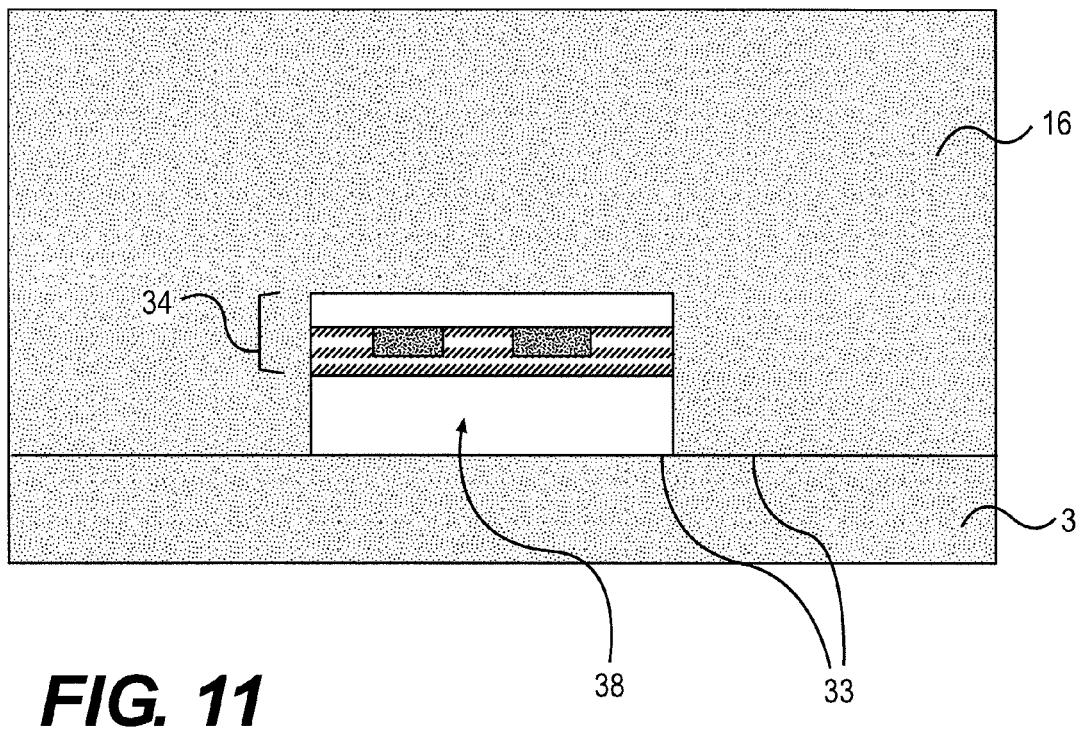
FIG. 11 shows a cover layer shown in FIGS. 9 and 10, which is applied to a substrate.

FIG. 9 shows a cover layer 16 from the inside, in which a recess a few micrometers deep has been inserted. This can be carried out, e.g., by etching. A boundary section 30 lying in an assembly plane 33 is hereby embodied, which boundary section surrounds a functional area 31 (the etched recess). Furthermore, a feed line section 32 to be assigned to the functional area 31 is provided, which connects the functional area 31 to the surroundings. The boundary section 30 forms a so-called bond frame, i.e., this area connects to the structured wafer with which they are connected. In the functional area 31 an insulating layer 35 is first applied. A metallization layer 36, which embodies the conductor structure 27 and/or 28, is applied thereto. Finally, a passivation layer 37 is applied to the metallization layer 36 or the insulating layer 35. The recess and the embodiment of the layer arrangement 34 can be better seen in the cross-sectional representation of FIG. 10.

Since an untight combustion chamber would be produced after the connection of cover layer 16 and substrate 3 (compare the space or channel 38 in FIG. 11), the space or channel 38 must be filled with a passivation material. This occurs before the connection of cover layer 16 and substrate 3. After the space 38 (in the area of the feed line section 32) has been filled, the passivation material is buffed and finally polished so that a flat assembly plane 33 is obtained and thus a reliable connection can be created between cover layer 16 and substrate 3.

Figure 12A:
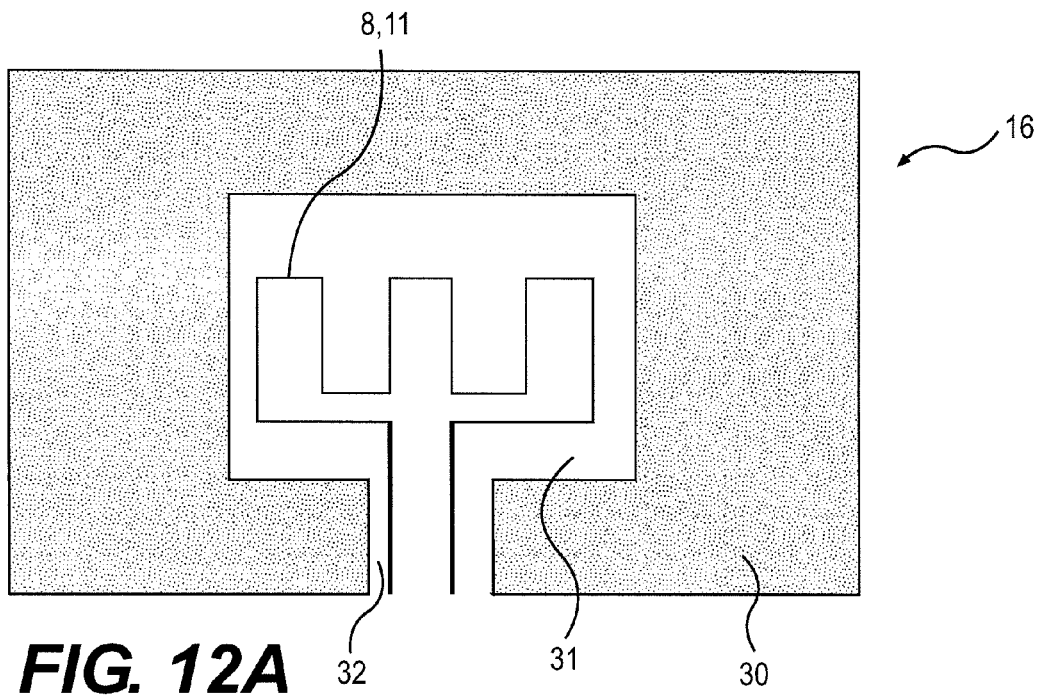
FIG. 12a shows a cover layer corresponding to the cover layer from FIG. 9.
Figure 12B:
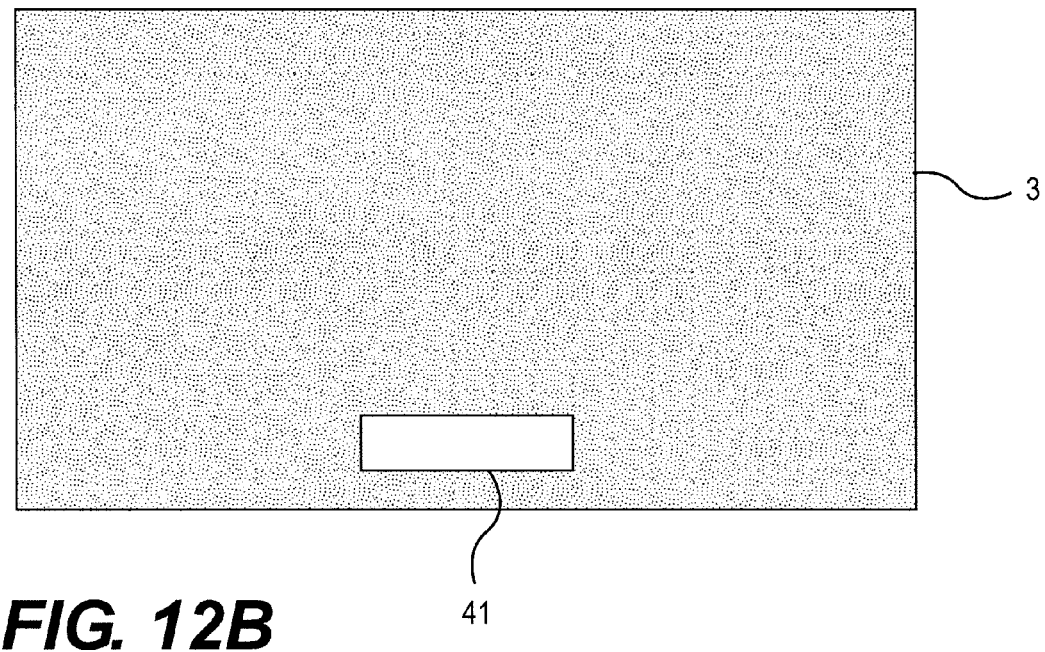
FIG. 12b shows a substrate with a cut-out.
Figure 12C:
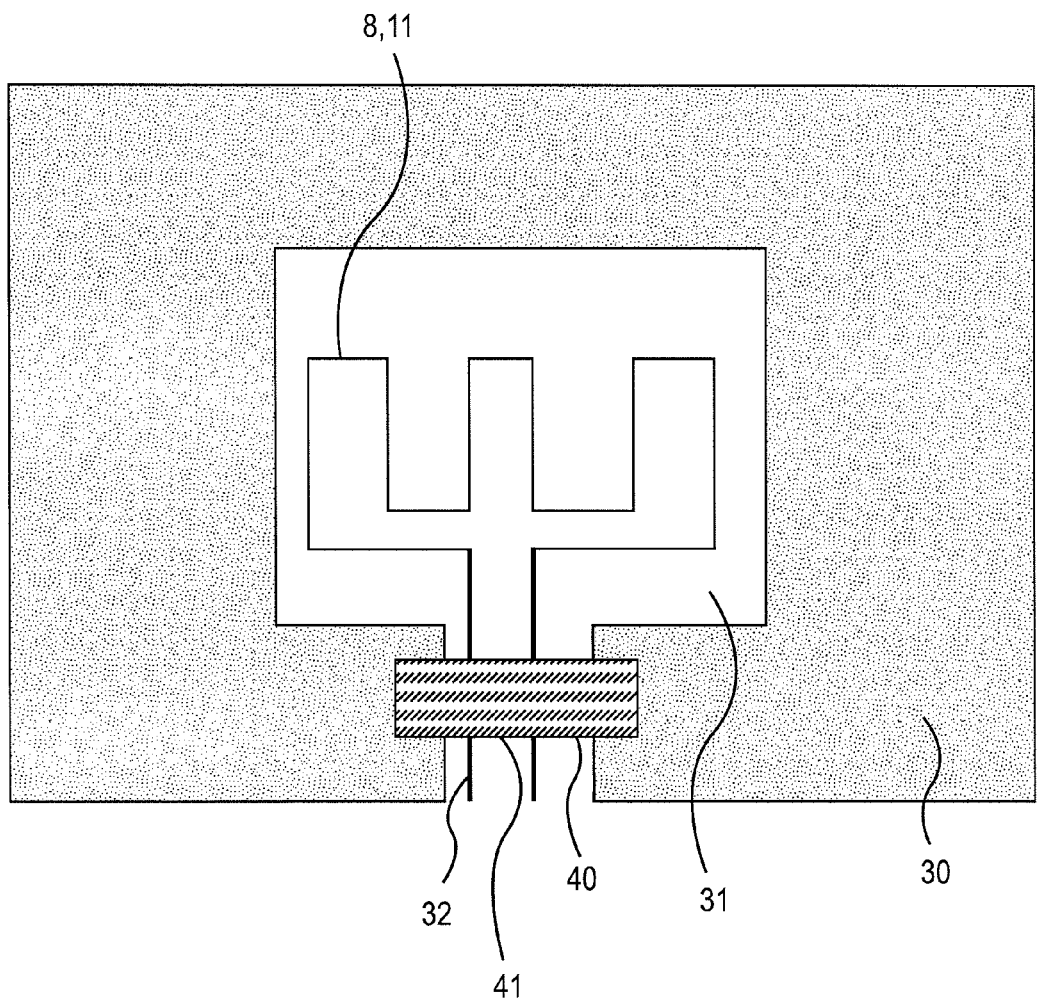
FIG. 12c shows a diagrammatic representation of a microthruster after the cover layer from FIG. 12a and the substrate from FIG. 12b have been joined.
Figure 13:
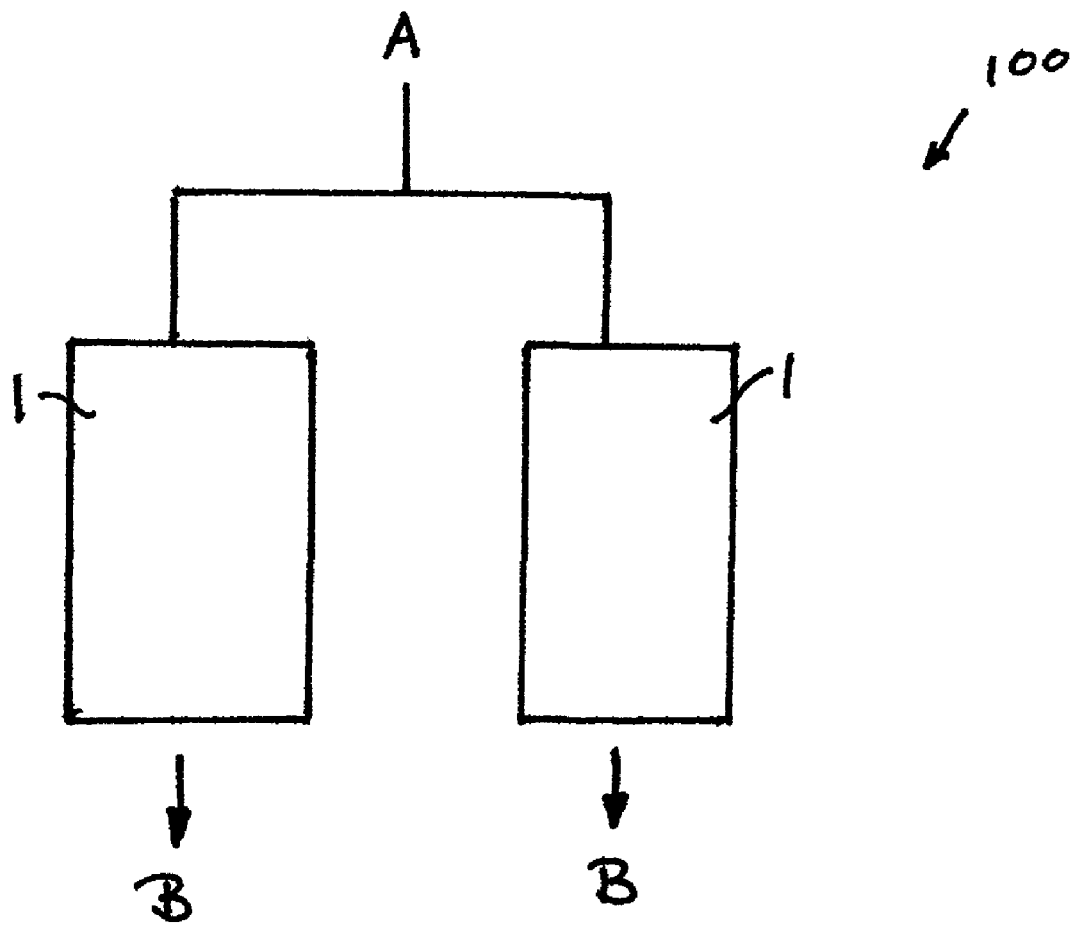
FIG. 13 illustrates a plurality of microthrusters arranged in an array.

An alternative method lies in providing the substrate with a cut-out 41 in the area of the feed line section 32, connecting cover layer 16 and structured substrate 3 to one another and subsequently closing the cut-out 41 with a sealing material, e.g., a solder glass or ceramic adhesive. This is shown in FIGS. 12a to 12c, wherein the functional components previously described are not shown in the substrate 3.

Further, it is understood that a plurality of microthrusters 1, as described above, can be arranged together, e.g., in the form of an array, to form a thruster 100.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A microthruster comprising:
a combustion chamber comprising a substrate material, a fuel inlet, and a gas outlet;
a first resistance heater arranged in the combustion chamber;
a catalyst structured and arranged to decompose fuel entering the combustion chamber; and
first substrate material sections heated by the first resistance heater to one of a predetermined temperature and a predetermined temperature range.

2. The microthruster of claim 1, further comprising
a thrust nozzle adjoining the gas outlet,
wherein at least one of:
the microthruster is adapted for use as a position adjustment thruster;
the combustion chamber is arranged with a structure formed by portions of the substrate material;
the first substrate material sections are made from portions of the substrate material;
the substrate material comprises an electrically conductive substrate material; and
one of:
the catalyst comprising the first substrate material sections;
the catalyst forming part of the first substrate material sections; and
the catalyst being integrally formed with the first substrate material sections.

3. The microthruster of claim 1, wherein at least one of:
the first resistance heater comprises the catalyst itself; and
the first resistance heater is integrally formed with the first substrate material sections.

4. The microthruster of claim 1, wherein at least one of:
the first substrate material sections are coated at least partially with a catalyst material; and
the first resistance heater comprises a catalyst layer arranged on the first substrate material sections.

5. The microthruster of claim 1, further comprising an insulating layer arranged at least partially between a catalyst layer and the first substrate material sections.

6. The microthruster of claim 1, wherein the first substrate material sections are arranged in the combustion chamber and have an at least partially porous surface structure.

7. The microthruster of claim 1, further comprising second substrate material sections, and one of:
the first substrate material sections being spaced apart by a first spacing and the second substrate material sections are spaced apart by a second different spacing; and
the first substrate material sections being spaced apart by a first spacing and the second substrate material sections are spaced apart by a second larger spacing.

8. The microthruster of claim 1, wherein a volume of the combustion chamber is at least partially defined by a cover layer of the combustion chamber, whereby the cover layer adjoins at least the first substrate material sections.

9. The microthruster of claim 1, wherein one of:
the first resistance heater comprises a conductor structure arranged in a meandering configuration; and
the first resistance heater comprises a conductor structure arranged in a meandering configuration and comprising a metal and being arranged on a cover layer.

10. The microthruster of claim 1, wherein the substrate material comprises one of:
silicon and silicon carbide (SiC); and
sapphire.

11. The microthruster of claim 1, wherein the microthruster is a monergol hydrazine thruster.

12. A thruster comprising a plurality of microthrusters of claim 1.

13. The thruster of claim 12, wherein the plurality of microthrusters are arranged in an array.

14. A method of making the microthruster of claim 1, the method comprising:
forming at least one of first and second substrate material sections on a substrate material one of a mechanical, physical or chemical process, the first and second substrate material sections having column-shaped portions which project into an interior of the combustion chamber; coating at least partially the first substrate material sections with the catalyst material; and
arranging a cover layer on the substrate material, whereby the cover layer at least partially defines the combustion chamber.

15. The method of claim 14, wherein the substrate material comprises sapphire, wherein the cover layer comprises an SOI substrate having a metal structure, and wherein the metal structure is arranged adjacent at least the first substrate material sections.

16. The method of claim 14, further comprising forming the first substrate material sections with at least a partially porous surface structure before coating with a catalyst material.

17. The method of claim 14, further comprising at least one of applying and forming an insulating layer between the first substrate material sections and the catalyst material.

18. The method of claim 14, further comprising at least one of:
electrically connecting at least one of the first substrate material sections and the catalyst material via a metal structure; and
electrically connecting at least one of the first substrate material sections and the catalyst material via a metal structure of a cover layer.

19. The method of claim 14, further comprising connecting together a cover layer and the substrate material via at least one of: direct bonding, eutectic bonding, solder glass adhesive, ceramic adhesive, and soldering.

20. The method of claim 14, further comprising forming a peripheral boundary section in a cover layer by an abrasion process, wherein the peripheral boundary section lies at least partially in an assembly plane, with which the cover layer is connected to the substrate material, whereby a functional area is defined and is set back with respect to the assembly plane.

21. The method of claim 20, further comprising at least one of arranging and forming a layer arrangement in the functional area, the layer arrangement comprising an insulating layer, a metallization layer, and a passivation layer.

22. The method of claim 14, further comprising:
at least one of arranging and forming a feed line section in a peripheral boundary section, wherein the feed line section is part of the functional area; and
filling a space between the passivation layer and the assembly plane with passivation material.

23. The method of claim 14, further comprising, after a cover layer and the substrate material are connected, filling a feed line section with a filler paste, the filler paste being inserted via a bore in the cover layer or the substrate material in a region of the feed line section.

24. The method of claim 14, further comprising applying an electrically insulating passivation layer to a back of the substrate material, whereby the electrically insulating passivation layer is opened only in an area of the first substrate material sections.

25. The microthruster of claim 1, wherein the substrate material is arranged to form a plurality of columns.

26. The microthruster of claim 1, wherein the substrate material is at least partially porous.

27. The microthruster of claim 1, wherein the substrate material having an adjustable porosity.

28. The microthruster of claim 1, further comprising a thruster nozzle arranged at the gas outlet.

29. A microthruster comprising:
a combustion chamber comprising a substrate material, a fuel inlet, and a gas outlet;
a first resistance heater arranged in the combustion chamber;
a catalyst structured and arranged to decompose fuel entering the combustion chamber;
first substrate material sections heated by the first resistance heater to one of a predetermined temperature and a predetermined temperature range; and
a second resistance heater arranged in an interior of the combustion chamber between the catalyst and the gas outlet, whereby a gas leaving the catalyst is heated.

30. The microthruster of claim 29, wherein one of:
the second resistance heater is arranged on second substrate material sections;
the second resistance heater forms part of second substrate material sections; and
the second resistance heater is integrally formed with second substrate material sections.

31. The microthruster of claim 30, wherein one of:
at least one of the first and second substrate material sections comprise portions of the substrate material of the combustion chamber and are made by one of a mechanical or chemical process;
at least one of the first and second substrate material sections comprise column-shaped portions of the substrate material of the combustion chamber;
at least one of the first and second substrate material sections comprise column-shaped portions of the substrate material of the combustion chamber formed on a base of the substrate material; and
at least one of the first and second substrate material sections comprise column-shaped portions of the substrate material of the combustion chamber integrally formed with a base of the substrate material.

32. A microthruster comprising:
a combustion chamber comprising a substrate material, a fuel inlet, and a gas outlet;
a first resistance heater arranged in the combustion chamber;
a catalyst structured and arranged to decompose fuel entering the combustion chamber; and
first substrate material sections heated by the first resistance heater to one of a predetermined temperature and a predetermined temperature range;
wherein a volume of the combustion chamber is at least partially defined by a cover layer of the combustion chamber, whereby the cover layer adjoins at least the first substrate material sections, and
wherein the cover layer is made from a structured silicon on insulator (SOI) wafer and is bonded via an electrical bonding to at least one of the first resistance heater and the first substrate material sections.

33. A microthruster comprising:
a combustion chamber comprising a substrate material, a fuel inlet, and a gas outlet;
a first resistance heater arranged in the combustion chamber;
a catalyst structured and arranged to decompose fuel entering the combustion chamber;
first substrate material sections heated by the first resistance heater to one of a predetermined temperature and a predetermined temperature range;
a cover layer having a peripheral boundary section;
a functional area surrounded by the peripheral boundary section; and
a layer arrangement arranged in the functional area and comprising an insulating layer, a metallization layer and a passivation layer, whereby the layer arrangement does not project beyond an assembly plane.

34. The microthruster of claim 33, further comprising:
a feed line section arranged in the peripheral boundary section; and
at least one of a passivation material and a filler paste arranged between the passivation layer and the assembly plane.

35. A microthruster comprising:
a combustion chamber comprising a substrate material, a fuel inlet, and a gas outlet;
a first resistance heater arranged in the combustion chamber;
a catalyst structured and arranged to decompose fuel entering the combustion chamber;
first substrate material sections heated by the first resistance heater to one of a predetermined temperature and a predetermined temperature range;
at least one of a first arrangement for detecting a first resistance of the first resistance heater and a second arrangement for detecting a second resistance of a second resistance heater; and
a third arrangement for determining a first temperature from the first resistance and a second temperature from the second resistance.

36. The microthruster of claim 35, further comprising:
a temperature sensor arranged outside the combustion chamber and coupled to an arrangement for compensating for a resistance drift of the first resistance and the second resistance.

37. The microthruster of claim 35, further comprising one of:
at least one of a third heater and a third resistance heater assigned to the thrust nozzle; and
at least one of a third heater and a third resistance heater for heating the thrust nozzle.

38. A microthruster comprising:
a combustion chamber comprising a substrate material, a fuel inlet, and a gas outlet;
a first resistance heater arranged in the combustion chamber;
a catalyst structured and arranged to decompose fuel entering the combustion chamber;
first substrate material sections heated by the first resistance heater to one of a predetermined temperature and a predetermined temperature range; and
one of:
a heater formed on a cover layer comprising a meandering conductor structure; and
a heater arranged on a cover layer comprising a meandering conductor structure of a metal or a conductive material.

39. A microthruster comprising:
a combustion chamber arranged in a substrate and comprising a fuel inlet and a gas outlet;
a first resistance heater arranged in the combustion chamber;
a catalyst structured and arranged to decompose fuel entering the combustion chamber; and
at least first substrate material sections formed in the substrate and heated by the first resistance heater to one of a predetermined temperature and a predetermined temperature range.

40. The microthruster of claim 39, further comprising a thruster nozzle arranged at the gas outlet.

\* \* \* \* \*